United States Patent [19]
Edwards

[11] Patent Number: 5,305,856
[45] Date of Patent: Apr. 26, 1994

[54] AUTOMATIC SLACK ADJUSTING MECHANISM INCLUDING A LOW FRICTION ADJUSTING GEAR

[75] Inventor: David J. Edwards, Shelby, Mich.

[73] Assignee: Rockwell International Corporation, Pittsburgh, Pa.

[21] Appl. No.: 954,599

[22] Filed: Sep. 29, 1992

[51] Int. Cl.$^5$ .............................................. F16D 65/56
[52] U.S. Cl. ............................ 188/79.55; 188/196 BA
[58] Field of Search ............ 188/79.55, 79.51, 196 BA, 188/200, 202, 79.54, 79.56, 79.57, 79.58, 79.59, 79.61

[56] References Cited

U.S. PATENT DOCUMENTS

| | | | |
|---|---|---|---|
| 3,351,164 | 11/1967 | Svensson | 188/196 BA |
| 3,507,369 | 4/1970 | Oliver | 188/196 BA |
| 3,949,840 | 4/1976 | Cumming et al. | 188/79.55 |
| 3,997,036 | 12/1976 | Zeidler | 188/79.55 |
| 4,019,612 | 4/1977 | Mathews et al. | 188/196 BA |
| 4,301,897 | 11/1981 | Cox, Jr. | 188/196 BA |
| 4,343,561 | 8/1982 | Campanini | 188/196 BA |
| 4,380,276 | 4/1983 | Sweet et al. | 188/196 BA |
| 4,499,978 | 2/1985 | Norcross | 188/79.55 |
| 4,798,265 | 1/1989 | Gibas | 188/79.55 |
| 4,825,979 | 5/1989 | Svensson | 188/79.85 |
| 4,926,980 | 5/1990 | Cumming | 188/79.55 |

*Primary Examiner*—Andres Kashnikow
*Assistant Examiner*—Chris Schwartz

[57] ABSTRACT

An automatic slack adjusting mechanism for a rotary oscillatory cam actuated brake assembly including an elongated housing having an opening therethrough and a bore, a worm gear rotatably mounted in the opening, a shaft mounted for rotation in the bore and having a worm nonrotatably secured thereto and drivingly engaging the gear. A detent part in the housing is axially fixed relative to the bore and a link is pivotally connected to one end of a plunger assembly and to the housing whereby pivotal movement of the link relative to the housing will move the plunger assembly relative to the detent part and the detent will rotate the plunger, the worm and the worm gear upon return movement of the plunger assembly following outward movement of the assembly beyond a predetermined distance relative to the detent. The detent part includes a spring biased pawl extending into toothed engagement with a helical toothed surface portion of the plunger. The opening includes a first, second and third bore having successively smaller diameters and forming flanges intermediate thereof. The worm gear is maintained in sliding relation with the second bore and a first intermediate flange by an annular retainer which is disposed in the third bore in abutting relation with a second intermediate flange. The retainer includes an annular channel formed from two coaxial axially extending portions connected by a radially extending portion which is filled with an elastomeric material which forms an annular face seal maintained proximate an annular face of the worm gear. The opposing annular faces include seals which cooperatively define a sealed area which extends radially inwardly of said annular face portions.

1 Claim, 3 Drawing Sheets

AUTOMATIC SLACK ADJUSTING MECHANISM INCLUDING A LOW FRICTION ADJUSTING GEAR

BACKGROUND OF THE INVENTION

1. Field of the Invention

This invention is directed to an automatic slack adjusting mechanism for a cam actuated brake assembly, and more specifically, to an automatic slack adjusting mechanism which features a low friction adjusting gear.

2. Description of the Related Art

Various types of cam actuation levers including automatic slack adjusting mechanisms for cam actuated brake systems are known in the prior art. One type is described in U.S. Pat. No. 3,949,840 which is herein incorporated by reference. Adjustment of the slack present in such a system is accomplished by rotation of a worm gear with respect to an angularly rotatable lever. The worm gear is driven by a pinion having a helical gear formed thereon. A thrust force associated with rotation of the pinion engaging the worm gear must be resisted. Such a design results in friction in the adjusting mechanism. A benefit may be realized by use of a low friction mechanism for accomplishing the slack adjusting feature.

SUMMARY OF THE PRESENT INVENTION

The present invention features an automatic slack adjusting mechanism for a rotary oscillatory cam actuated brake assembly including an elongated housing having an opening therethrough and a bore, a worm gear rotatably mounted in the opening, a shaft mounted for rotation in the bore and having a worm nonrotatably secured thereto and drivingly engaging the gear. A plunger assembly including a plunger slidably mounted in the bore having an axially movable rotary driving connection with the shaft in the bore. Detent means in the housing being axially fixed relative to the bore and link means pivotally connecting one end of the plunger assembly to the housing whereby pivotal movement of the link means relative to the housing will move the plunger assembly relative to the detent means and the detent means will rotate the plunger, the worm and the worm gear upon return movement of the plunger assembly following outward movement of the assembly beyond a predetermined distance relative to the detent means. The plunger is a cylinder having a splined connection with the shaft and a helical toothed surface portion. The detent means includes a spring biased pawl extending into toothed engagement with the helical toothed surface portion. The opening includes a first, second and third bore having successively smaller diameters and forming flanges intermediate thereof. The worm gear has a circumferential portion and two annular face portions which define bearing surfaces. The worm gear is maintained in sliding relation with the second bore and a first intermediate flange by an annular retainer which is disposed in the third bore in abutting relation with a second intermediate flange. The retainer includes an annular channel formed from two coaxial axially extending portions connected by a radially extending portion which is filled with an elastomeric material which forms an annular face seal maintained proximate an annular face of the worm gear. The opposing annular faces include seals which cooperatively define a sealed area which extends radially inwardly of said annular face portions.

These and other aspects of the present invention will become more readily apparent by reference to the following detailed description of the embodiments as shown in the drawings.

DETAILED DESCRIPTION OF THE PREFERRED EMBODIMENT

Figure 1:
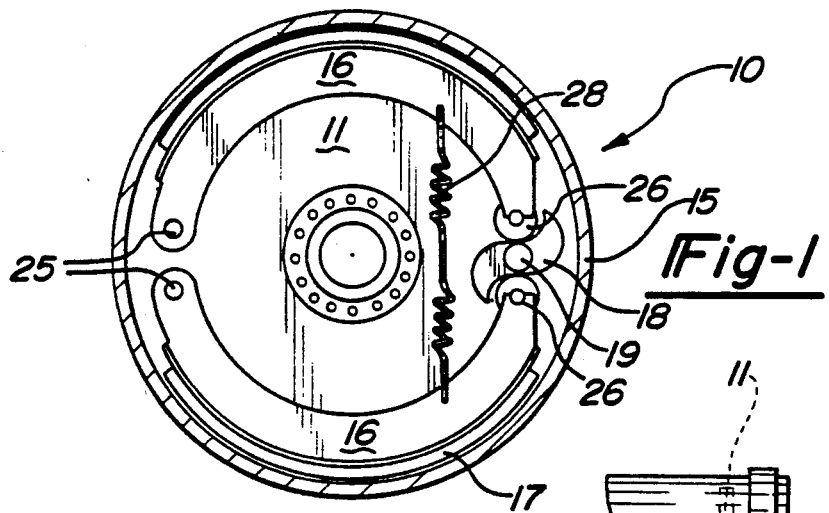
FIG. 1 is a side view partly in section of a cam actuated brake assembly.
Figure 2:
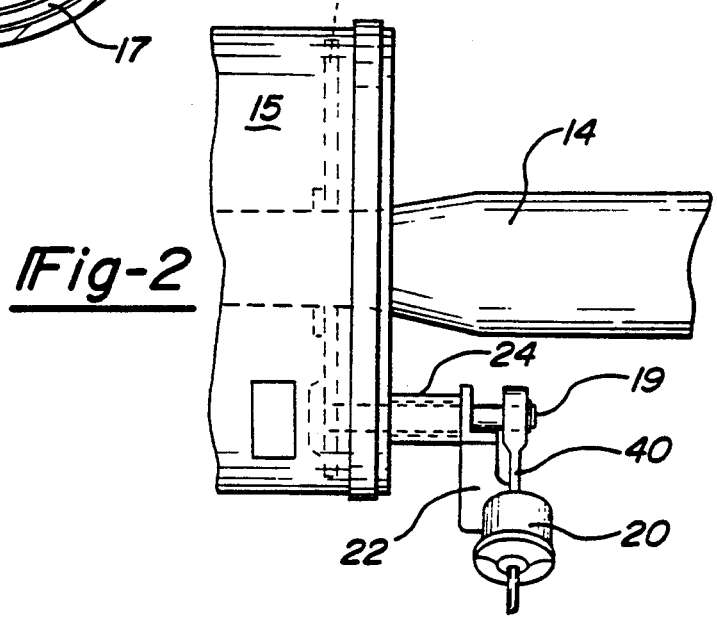
FIG. 2 is a top plan view of the brake assembly of FIG. 1.
Figure 3:
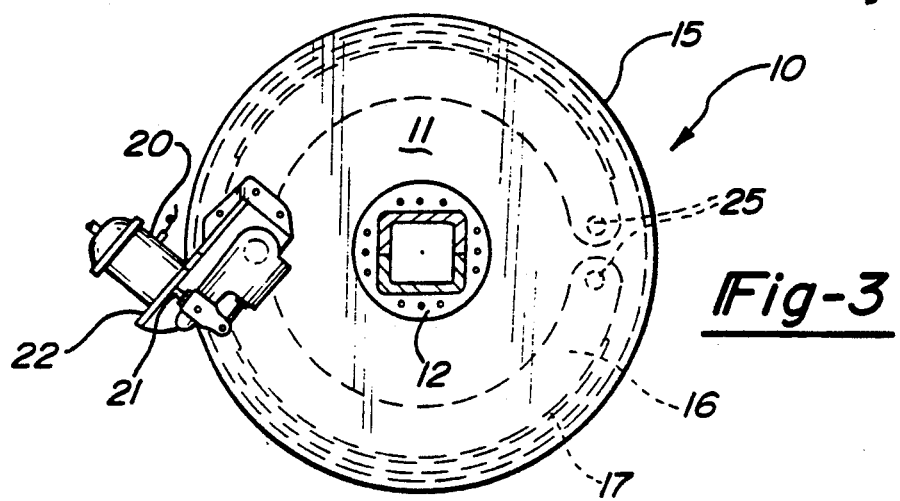
FIG. 3 is a view taken on the line 3—3 of FIG. 2.

In FIGS. 1 through 3, the present invention is shown in combination with cam actuated brake assembly 10 supported by spider 11 which is secured to vehicle axle 14. Brake assembly 10 is comprised of brake drum 15, a pair of brake shoes 16, brake actuating cam 18 nonrotatably secured to cam shaft 19, actuating motor 20 having reciprocating brake actuating rod 21 and lever 40 operatively interconnecting brake actuating rod 21 and cam shaft 19. Brake shoes 16 are each respectively provided with linings 17. Actuating motor 20 is supported by an angle bracket 22 secured as by welding to one end of tube 24. Tube 24 is welded at its other end to spider 11 and encloses a link of cam shaft 19. Brake shoes 16 are each respectively mounted for pivotable movement about pin 25 fixed to spider 11. The opposite ends of brake shoes 16 are provided with roller followers 26 biased into engagement with an S-type brake actuating cam 16 by spring 28.

Brake assembly 10 as thus far described is well known in the art and is normally operated by depressing the vehicle brake pedal which supplies fluid pressure, usually air, to actuating motor 20. The fluid pressure operating on a piston or diaphragm in motor 20 forces actuating rod 21 outwardly of the motor housing thereby rotating lever 40 and cam shaft 19 clockwise as viewed in FIG. 3 about the axis 100. Cam shaft 19 rotates brake actuating cam 18 in a clockwise direction as viewed in FIG. 1. Rotary movement of cam 18 as transmitted through roller followers 26 forces brake shoe 16 to pivot about pins 25 until the brake shoe lining is pressed into frictional contact with brake drum 15. When the brakes are released, fluid pressure is exhausted from actuator motor 20 and means internally of motor 20, usually a spring, return actuating rod 21 and lever 40 to their normally retracted position as shown in FIG. 3. When the fluid pressure is exhausted from actuating motor 20, brake shoe 16 and lining 17 are returned by spring 28 to their normal running position as shown in FIG. 1 where a clearance space is provided between lining 17 and brake drum 15. Spring 28 acting through brake shoe 16 and roller followers 26 also assist in returning cam 18, cam shaft 19 and lever 40 to their normal braking position as shown in FIGS. 1-3.

Figure 4:
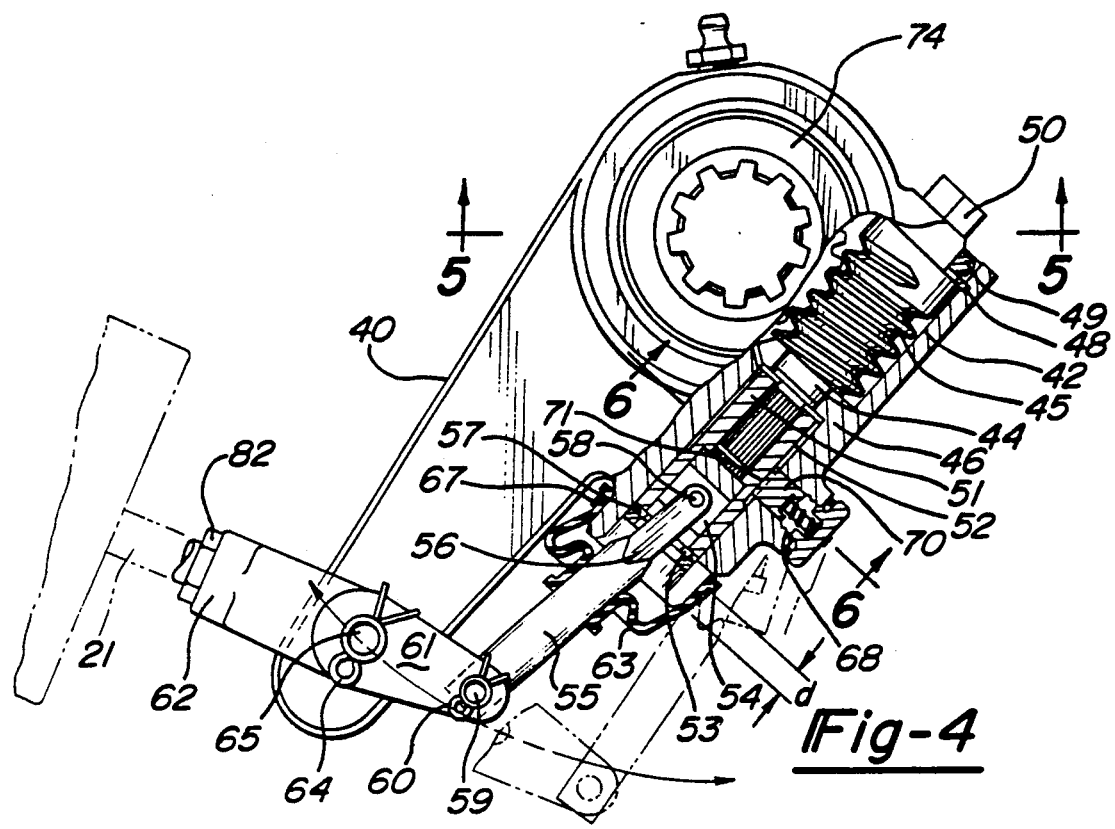
FIG. 4 is an enlarged side elevation of the lever and automatic slack adjusting mechanism of the present invention with part of the mechanism housing broken away for clarity of illustration.
Figure 5:
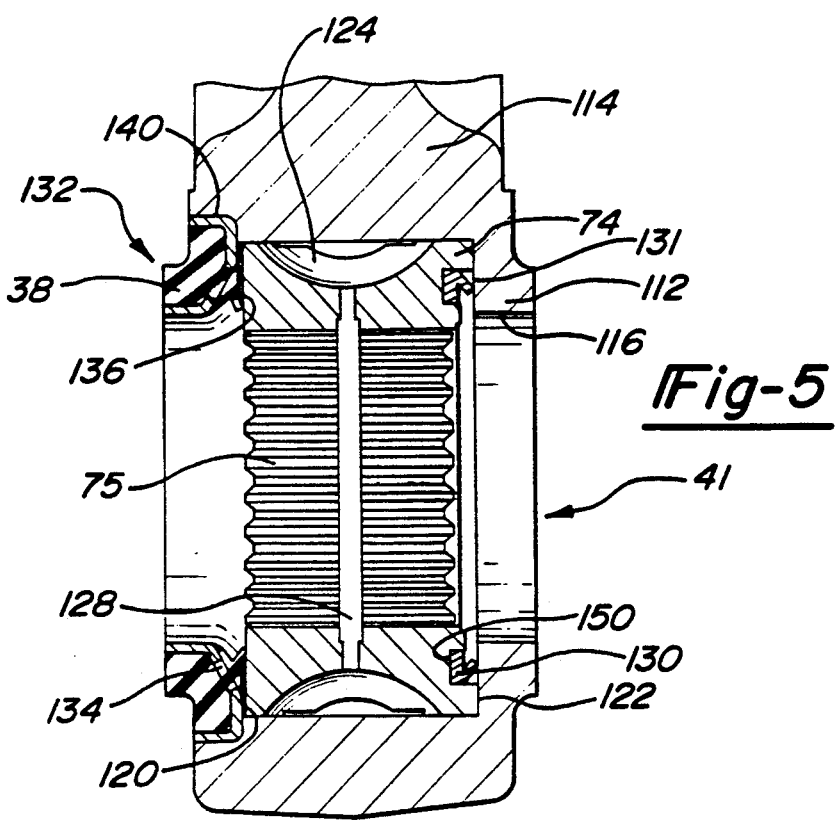
FIG. 5 is a sectional view taken on the line 5—5 of FIG. 4.
Figure 6:
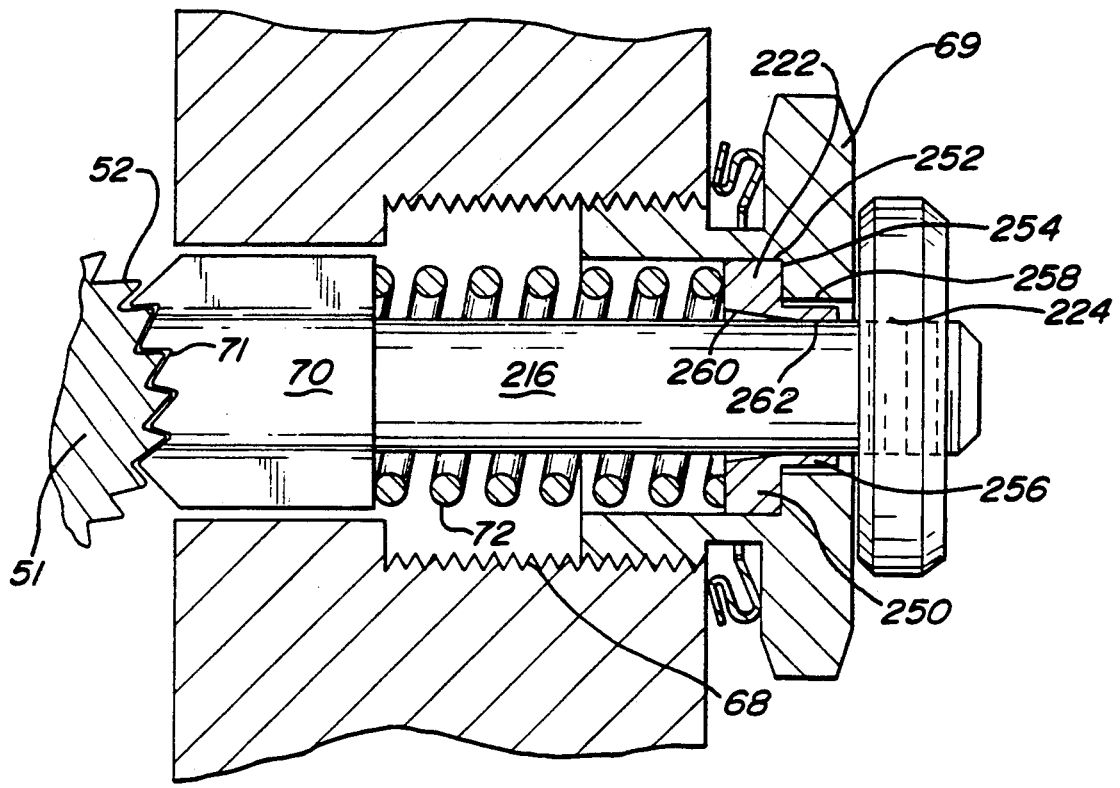
FIG. 6 is an enlarged sectional view of the pawl assembly of the present invention taken on the line 6—6 of FIG. 4.

The invention will now be described with particular reference to FIGS. 4 and 5 where lever 40 and the automatic slack adjusting mechanism are shown in detail. Lever 40 is an elongated housing having an opening 41 adjacent one end and a bore 42 extending partially along the length of the housing. Shaft 44 having worm 45 formed integral therewith is rotatably mounted in the bore between shoulder 46 and snap ring 48. Seal 49 is provided axially outward of snap ring 48 and the internal surfaces of seal 49 and shoulder 46 provide radial bearing surfaces for shaft 44. The end of shaft 44 which extends axially outward of worm seal 49 is formed as a square driving head 50 to provide an externally accessible means for manually rotating the shaft. The opposite end of shaft 44 extends beyond shoulder 46 and has a longitudinally movable rotary driving splined connection internally of plunger 51 provided in the form of a hollow cylinder. The exterior surface portion of the plunger concentric with the interior spline connection to shaft 44 is provided with a plurality of circumferentially spaced, axially extending helical teeth 52. The piston 54 is freely slidably disposed within the interior of plunger 51. The hollow interior of plunger 51 is provided with a circumferentially extending groove 53 axially outward of piston 54. A retainer ring 57 is fitted to groove 53 to prevent piston 54 from being withdrawn from the plunger and to provide a piston engaging abutment for moving plunger 51 axially outward of bore 42 in response to axially outward movement of piston 54 beyond a distance d, as shown in FIG. 4. Piston 54 is diametrically slotted to receive flat end 56 of rod 55 pivotally connected to piston 54 by pin 58. The opposite end of rod 55 is pivotally connected by means of pin 59 and cotter key 60 to the bifurcated end of clevis 61. The opposite end of clevis 61 is provided with an internally threaded bore 62 which receives the threaded end of brake actuating rod 21. The end of lever 40 opposite opening 41 extends between the legs of the bifurcated end of clevis 61 where it is pivotally connected intermediate the ends of the clevis by means of cotter key 64 and pin 65, passing through an appropriate sized hole in the lever. The end of bore 42 receiving rod 55 is closed by flexible loop seal 63, elastically snugly fitted about rod 55 and secured by a retaining clamp 67 to a boss-like projection of lever 40. Lever 40 is also provided with a bore 68 which intersects bore 42 opposite helical tooth portion 52 of plunger 51. Pawl 70 having buttressed teeth 71 is formed having integral shaft portion 216 to which retraction nut 224 is threadingly engaged. As shown in FIG. 6, pawl 70 is disposed for reciprocation in bore 68. Spring 72 is seated against pawl 70 in addition to seal 222 disposed in a first and second internal bore of cap screw 69. Seal 222 has a first portion 250 which is resiliently retained in first internal bore 252 of cap screw 69 and maintained in abutting relation to flange 254 of cap screw 69. Seal 222 has a second portion 256 which is located proximate the second internal bore 258 which provides a radial clearance thereabout. Seal 222 has an internal bore which seals around shaft 216. The bore has an inwardly tapered portion 260 in the region of the first portion 250 and a radially constant portion 262 in the region of the second portion 256. Seal 222 is retained in the first and second internal bores 252 and 258 by resilient compression imparted by spring 72. Seal 222 provides a seal which allows reciprocation of shaft 216. In addition, the tapered portion 260 in combination with the radial clearance provided about the second portion 256 provide a controlled avenue which releases lubricants during lubrication operations when an internal pressure is reached at which lubrication has coincidentally reached all regions intended to be lubricated. Pawl 70 thus features a modular assembly of components which are structurally interconnected upon assembly prior to installation in threaded bore 68. In an operation in which it is desired to relieve the brake adjustment, a bladed instrument may be forced between nut 224 and cap screw 69 to exert axial force on pawl 70 to disengage same from plunger 51 by disengaging teeth 71 and 52. Next, nut 50 may be turned to accomplish the desired brake adjustment relief.

A worm gear 74 having splined internal opening 75 is mounted for rotation in lever opening 41. As best shown in FIG. 5, boss 112 defines a thrust surface in opening 41. Opening 41 further includes coaxial bore portions 114, 116 and 140. Coaxial bores 114 and 116 form first flange 131 intermediate thereof. Further coaxial bores 116 and 140 form second flange 139 intermediate thereof. Worm gear 74 has circumferentially extending face portions 120 and 122 and worm teeth 124 formed in the circumferential portion thereof. Splined internal opening 75 receives a cam (not shown) for rotation therewith. Grease passage 128 provides avenues for distribution of grease throughout sliding portions of the assembly. An annular groove 150 formed in annular face portion 115 of worm gear 74 receives a seal 130 which provides a sealing engagement between the inward radial portion of annular face 122 and flange portion 131. Retainer 132 is press fit and retained by interference fit in retainer bore 140. Subsequent to installation of retainer 132, retainer seal 136 a lip seal maintains a sealing engagement with the inward radial portion of annular face 113. Retainer 132 comprises a stamping which is formed of a U-channel having passage 134 formed therein to facilitate flow of an elastomeric material 38 which enhances the structural rigidity of retainer 132 and as well is molded to form lip seal 136. The U-channel includes a first axially extending portion 155 continuously connected to a second axially extending portion 157 by a radially extending portion 159. One skilled in the art will appreciate that the sliding portions of gear 74 are lubricated and protected from contamination and/or corrosive effect thereof. Such a design provides a low friction adjusting mechanism for accomplishing slack adjustment.

As best shown in FIG. 4, teeth of worm 45 drivingly engage teeth of worm gear 74. Rotary movement of shaft 44 and worm 45 in bore 42 will rotate worm gear 74 and cam shaft 19 relative to lever 40. Since worm 45 is fixed by shoulder 46 and snap ring 48 against axial movement in bore 42, worm 45 functions as a stationary part of lever 40 and rotates worm gear 74 and cam shaft 19 when lever 40 is pivoted about the axis of cam shaft 19 by actuating rod 21 and clevis 61.

Lever 40 is installed to a brake assembly in the following manner. Clevis 61 is threaded to actuating rod 21 and secured in place by jam nut 82. Lever 40 is then axially positioned over splined end 29 of cam shaft 19. Lever 40 is then rotated about cam shaft 19 by manually rotating square driving head 50 of shaft 44 until the openings in lever 40 and clevis 61 are properly aligned to receive pin 65. After lever 40 and clevis 61 have been pivotally connected, rod 55 is connected by means of pin 59 and cotter key 60 to clevis 61. The assembly may then be adjusted either manually or by rotating the square driving head or automatically by applying and releasing the brakes until the desired running clearance is established between the brake shoe lining 17 and the brake drum 15.

Automatic adjustment is effected by operation of shaft 44, worm 45, plunger 51, piston 54 and linkage 55, 61 pivotally connected to piston 54 and lever 40. Axial movement of actuating rod 21 in a brake applying direction moves clevis 61 and lever 40 counterclockwise as viewed in FIGS. 3 and 4 about the axis of camshaft 19. During such movement clevis 61 traverses an arcuate path as shown by the chain line in FIG. 4 and, pivoting about pin 65 moves rod 55 and piston 54 outward relative to plunger 51 and bore 42 as shown by phantom lines. The spacing or distance d provided between piston 54 and retaining ring 57 permits piston 54 to move freely within that axial length of the plunger. The distance d is calculated relative to the arcuate movement of cam shaft 19 which is required to take up the normal running clearance desired between brake lining 17 and brake drum 15 and a substantial portion of that arcuate movement which produces distortion in the brake assembly. The remaining arcuate movement producing distortion in the assembly and the lining wear allowable before automatic adjustment is to be effected are accommodated by the axial length of each of buttressed teeth 71. Thus, as long as brake lining 17 has not experienced appreciable wear, piston 54 will abut ring 57 and move plunger 51 outward relative to bore 42 and pawl teeth 71. After the acceptable amount of lining wear, plunger 51 moving relative to spring bias pawl 70 will cause pawl 70 to retract and engage an adjacent set of helical teeth 52 on plunger 51. After the brakes are released and lever 40 and plunger 51 are returning to the normal position as shown in FIG. 4, buttressed teeth 71 of pawl 70 will rotate plunger 51 on shaft 41 and worm 45 to effect a predetermined arcuate movement of worm gear 74 and cam shaft 19. This will effect a slight rotary adjustment of S-type actuating cam 18 as shown FIG. 1 to pivot brake shoes 16 outwardly until the desired running clearance is again established between lining 17 and brake drum 15. In one embodiment of the invention as shown in FIG. 4, the distance d is preferably about 0.225 inch and the axial length of each of the buttressed teeth 71 is about 0.119 inch. This provides a predetermined distance or a total axial movement of piston 54 and plunger 51 of about 0.344 inch before automatic adjustment is effected. Although rod 55, piston 54 and plunger 51 are moved by the clevis during every brake applying movement of the actuating rod, the brake applying forces are transmitted through the lever independently of the automatic slack adjusting mechanism and automatic adjustment is effected upon return or brake releasing movement of the lever.

The foregoing cam, actuating lever and automatic slack adjusting mechanism has been described in combination with an S-type oscillating rotary cam actuated drum-type brake system. The actuating lever and automatic adjusting mechanism is not limited to use in a drum-type brake system but may be used equally well in combination with other cam actuated brake systems employing an actuating lever, for example, a cam actuated disc type brake system.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. An automatic slack adjusting mechanism for a rotary oscillating cam actuated brake assembly including an elongated housing having an opening therethrough and a bore, a worm gear rotatably mounted in said opening, a shaft mounted for rotation in said bore and having a worm non-rotatably secured thereto, said worm drivingly engaging said gear, a plunger assembly including a plunger slidably mounted in said bore, said plunger having an axially movable rotary driving connection with said shaft in said bore, detent means in said housing, said detent means being axially fixed relative to said bore and link means pivotally connecting one end of said plunger assembly to said housing whereby pivotal movement of said link means relative to said housing will move said plunger assembly relative to said detent means and said detent means will rotate said plunger, said worm and said worm gear upon return movement of said plunger assembly following outward movement of said assembly beyond a predetermined distance relative to said detent means and said plunger is a cylinder having a splined connection with said shaft and a helical toothed surface portion and said detent means includes a spring biased pawl extending into toothed engagement with said helical toothed surface portion; the improvement comprising:

said opening including first, second and third coaxial bores defined therein;

said opening including a first flange disposed intermediate said first and second bores and a second flange disposed intermediate said second and third bores;

said worm gear including a circumferential portion defining a bearing surface disposed in slidable association with said second bore;

said worm gear including axially displaced first and second radially extending annular bearing surfaces;

a first annular bearing surface disposed in sliding relation with said second flange;

an annular retainer disposed in said first bore in abutting relation with said first flange;

wherein said retainer comprises an annular channel formed having a first axially extending portion continuously connected to a radially extending portion which is continuously connected to a second axially extending portion disposed coaxial to said first axially extending portion and said retainer includes an elastomeric material disposed in said channel in contact with said first and second axially extending portions and said radially extending portion;

said retainer is maintained in said first bore by interference fit and thereby retains said worm gear in slidable association with said second bore and sliding relation with said second flange; and said elastomeric material extends through openings defined in said channel continuously forming an annular seal maintained proximate a second annular bearing surface of said worm gear.

* * * * *